May 9, 1950　　　P. W. MOORE, JR　　　2,507,453
BLANK GAUGE FOR SHEARING MACHINES
Filed Sept. 25, 1946　　　　　　　　　　2 Sheets-Sheet 1
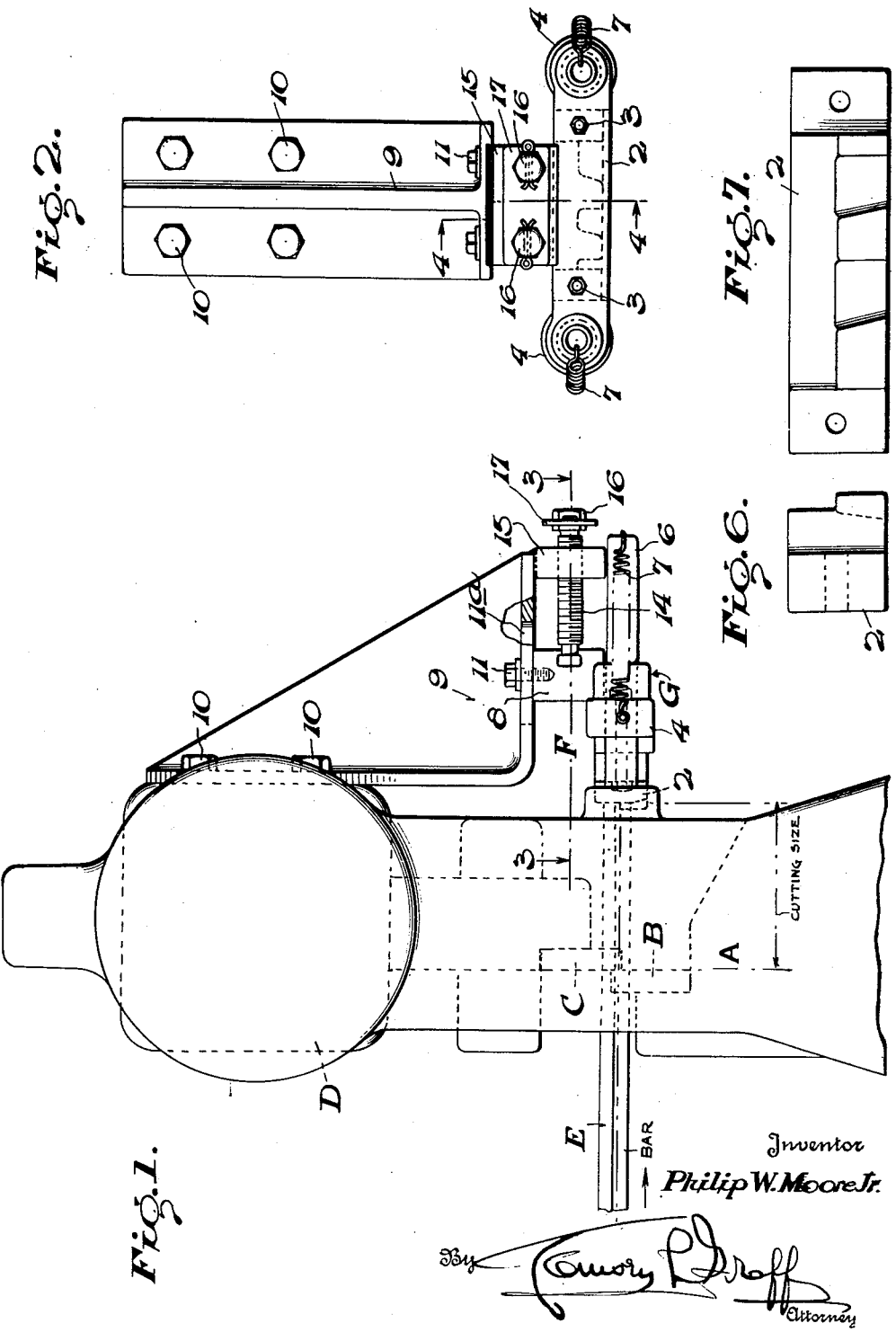
Inventor
Philip W. Moore Jr.
By
Attorney May 9, 1950 P. W. MOORE, JR 2,507,453
BLANK GAUGE FOR SHEARING MACHINES
Filed Sept. 25, 1946 2 Sheets-Sheet 2

Inventor
Philip W. Moore Jr.
By Emory L. Groff
Attorney

Patented May 9, 1950

2,507,453

UNITED STATES PATENT OFFICE 2,507,453

BLANK GAUGE FOR SHEARING MACHINES

Philip W. Moore, Jr., Winnetka, Ill., assignor to Poor & Company, Chicago, Ill., a corporation of Delaware Application September 25, 1946, Serial No. 699,326

16 Claims. (Cl. 164—59)

This invention relates to shearing machines, and more particularly to a novel gauge assembly for cutting bar stock, for example, into blanks of pre-selected uniform length.

Gauges of various types have heretofore been used on shearing machines, but in most cases they include a stationary abutment with which the leading end of the stock to be cut engages as it is manually fed into the machine. Due to the handler of the stock pushing it so hard as to cause the bar to re-bound from the gauge, or subsequently due to man fatigue, and consequent failure to push the bar stock far enough inwardly, many undersized blanks are produced which can be used only as scrap. Accordingly, a primary object of the invention is to eliminate waste by providing a blank length gauge movably mounted relative to the line of stock feed and which is automatically co-ordinated with the movement of the reciprocating shear blade so that as the ram carrying the latter descends, suitable means moving with the ram pushes the gauge and the stock toward the fixed blade or anvil of the shear to thus assure a fixed distance between the shear and the gauge as well as a fixed length for the blank. That is to say, the stock abutting the gauge is pushed backwardly a selected set distance on each downstroke of the ram to a point where it is held fixed relative to the shear blades so as to insure the severance of the stock into uniform lengths within the range of the gauge's movement. As the result of the invention embodying the features described herein, even with the shear operating at better than thirty strokes per minute, the cutting of undersized blanks is practically eliminated. The range of the gauge's movement equals the extent to which the operator is permitted to overfeed the stock.

Another object of the invention is to provide novel means for mounting the blank length gauge in an effective manner to yield under the pressure of a gauge control member carried by the ram and move opposite to the direction of feeding.

A further object is to adjustably mount the gauge control member on a bracket carried by the ram so that it may be firmly locked in selected set position with respect to the blank length gauge and the anvil of the shear, thereby enabling the gauge to be readily adapted to accurately cut blanks in different lengths.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a side elevation of a reciprocating shearing machine having the present improved blank length gauge assembly applied thereto.

Figure 2 is a detail rear elevation of the bracket of the gauge means shown in Figure 1.

Figure 6 is a detail end view of the stock abutting element of the gauge assembly.

Figure 7 is a front elevation of the stock abutting face of the gauge assembly.

Similar reference characters designate corresponding parts throughout the several figures of the drawing.

Figure 3:
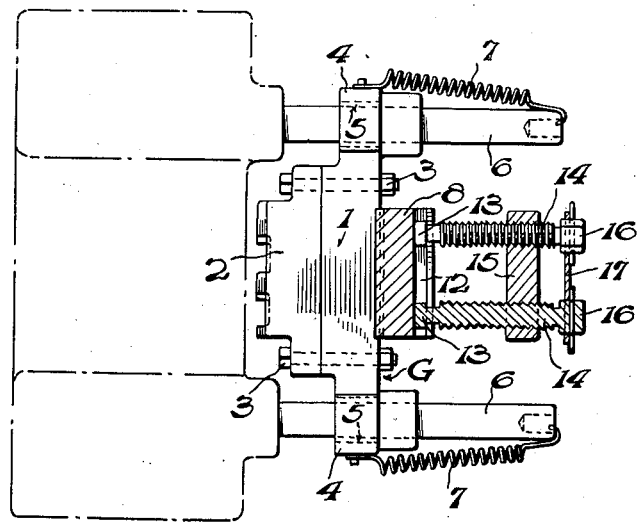
Figure 3 is a horizontal sectional view taken on the line 3—3 of Figure 1.

Referring to Figure 1 it will be observed that a conventional type of reciprocating shearing machine is illustrated, the same including the base or bed A having the fixed blade or anvil B and the movable blade C, carried by the ram designated generally as D. The bar stock E to be cut is manually advanced between the shear blades B and C toward the present blank length gauge assembly designated generally as F.

The said blank length gauge assembly F is applied to the rear of the frame of the shearing machine, with the stock abutting blank gauge element G disposed substantially in the line or plane of horizontal feed of the stock E. The gauge or abutment element G includes a support or carrier 1 having a stock abutting face-member 2 secured thereto by bolts or equivalent fastenings 3. The support 1 is provided at opposite sides with extension portions 4 having therein bushed openings 5 for receiving the rods or guides 6 extending horizontally rearward from the base of the machine substantially at the level of stock feed. The gauge G is thus mounted for relative sliding movement on the guides 6 and is normally urged in a rearward direction by springs 7 whose forward ends are attached to the extension portions 4 of the support 1 while their rear ends are suitably anchored to the rear ends of the guides 6.

Figure 4:
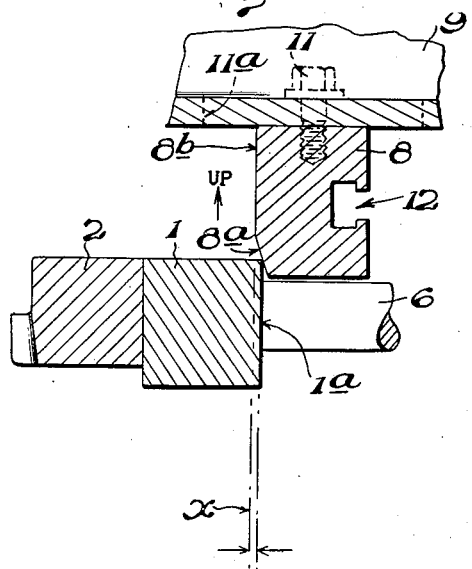
Figures 4 and 5 are detail cross sectional views taken on the line 4—4 of Figure 2, and respectively showing the gauge and gauge control member in their normal and working positions.
Figure 5:
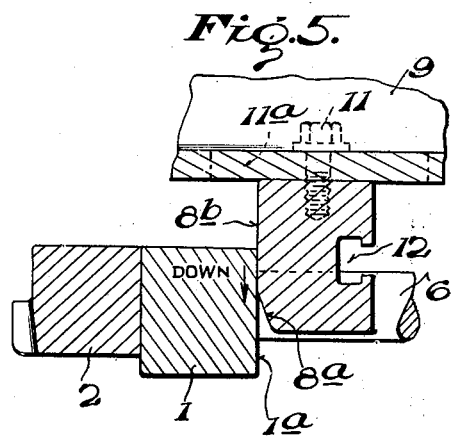

The rear vertically flat face 1a of the support 1 cooperates with a gauge control member 8 in the form of a block of steel carried by a bracket 9 which is secured to the ram D by the fastenings 10. The block 8 is adjustable along the bottom flange of the bracket 9 by the bolt and slot arrangement designated generally as 11 and 11a. The front face of the block 8 is provided with an inclined face or wedge portion 8a and a vertical face 8b. When the ram D is in its uppermost position the wedge face 8a engages with the upper edge of the rear face 1a of the support 1 as shown in Figure 4. As the ram D descends and carries the bracket 9 with it, the wedge face 8a pushes the blank length gauge 1—2 backward to the direction of stock feed until the vertical face 8b flushly engages the rear face 1a of the support 1 thereby firmly backing up the gauge proper during the shearing operation. It will, of course, be understood that the support 1 of the gauge assembly G is urged at all time toward the block 8 by the springs 7.

As previously explained, the block 8 is supported on the underside of the bracket 9 by the bolt and slot arrangement 11—11a. However, in order to accurately set the block 8 with reference to the line of shear to insure the cutting of the stock into predetermined uniform lengths, suitable adjustment means is provided for the block 8. As it will be observed from the drawings, the rear face of the block 8 is provided with a key slot 12 which swivelly receives the heads 13 of the adjusting screws 14. The screws 14 are rotatably mounted in a strap 15 securely welded at its upper end to the outer end of the bracket 9. By turning the screws 14 with the aid of a suitable tool applied to the outer heads 16 thereof, and temporarily loosening the bolts 11, the block 8 may be adjusted horizontally with reference to the shear blades B and C within relatively fine and accurate limits. After the desired adjustment or setting of the block 8 is effected the bolts 11 may be tightened, and, in order to prevent the screws 14 from turning in the strap 15, the outer heads 16 thereof are engaged by a common locking plate 17 provided with openings conforming to the contours of the heads 16, the said plate 17 being held to the bolt heads 16 by the use of cotter pins, or the equivalent. The plate 17 not only effectively prevents rotation of both screws 14, but also prevents the rotation of one screw relative to the other. It will thus be apparent that the supporting bolts 11 and the adjustment bolts 14 provide means for accurately and firmly positioning the block 8 relative to the shear blades B and C.

The operation of the apparatus is as follows:

Assuming that the ram D is at the top of its stroke and the shear blades B and C are separated, the workman handling the bar stock E pushes the latter between the blades until the leading end of the stock engages the face plate 2 of the gauge assembly. As the stock is thus positioned, and the ram D descends, the block 8 carried by the bracket 9 will also descend so that the wedge face 8a of the block pushes the gauge backwards to the line of stock feed a distance indicated at x in Figure 4 until the flat vertical rear face 1a and front vertical face 8b of parts 1 and 8 slidably engage each other. Thus, the bar stock E is pushed rearwardly a distance x, and, at the instant the shear blades B and C begin to cut the stock, said faces 1a and 8b hold the stock to precisely the length desired to effect shearing and avoid the production of undersized blanks.

While the present apparatus has specific application to the formation of blanks from stock for rail anchors, nevertheless, it will be understood that the same has general application to all cases where the stock of bar or sheet form is to be cut into accurate lengths.

The distinctive feature of the invention resides in providing a blank length gauge which pushes the stock backwardly to the direction of stock feed so that as the shear blades effect cutting, all of the severed blanks will be of uniform length. In other words, the backward moving abutment 2 will take up any slack if such exists between the leading end of the stock and the abutment, or, if the end of the stock engages the abutment directly the entire stock bar will be pushed reversely to the line of feed. By way of illustration it may be pointed out that the distance between the cutting edges of the shear blades B and C and the stock abutment face of the gauge 2 may be a quarter of an inch more than the specified length of the blank to be cut. For example, if the blank is to be cut to exactly ten inches in length, the distance between the cutting edges of the shear blades and the abutment face of the gauge 2 will be set at ten and a quarter inches, thus the operator can actually push the bar stock a quarter of an inch in excess of the required length of the blank, and the gauge abutment 2 under pressure of the wedge surface 8a pushes the bar stock back to the exact ten inch length before the shear blades touch it. In this way, cutting of undersized blanks is practically eliminated.

It will, of course, be understood that changes in the form and proportion of parts may be resorted to within the scope of appended claims.

I claim:

1. A blank length gauge for shearing machines having fixed and movable shear blades, comprising, a stock abutting blank gauge element slidably and yieldably mounted in the line of stock feed to the rear of the blades, and means connected to the movable blade and synchronized with its descent to push said element forwardly with the stock prior to the blades effecting cutting for gauging the blank to accurate length.

2. A blank length gauge for shearing machines having fixed and movable shear blades, comprising, a stock abutting blank gauge element slidably mounted in the line of stock feed to the rear of the blades, and means connected to the movable blade and synchronized with its descent to push said element forwardly with the stock prior to the blades effecting cutting for gauging the blank to accurate length.

3. In a shearing machine having a fixed blade and a reciprocating blade, blank length gauge means, comprising, a slidably and yieldably mounted abutment against which the leading end of the stock is adapted to engage when the same is inserted between the separated shear blades, and means mounted for operation with the reciprocating blade of the shear for pushing said abutment oppositely to the line of feed for a predetermined distance prior to the shear blades effecting cutting.

4. In a blank shearing machine for dividing bar or like stock into blank lengths, a frame, a fixed shear blade, a movable shear blade, a ram carrying said movable shear blade, and a blank length gauging abutment mounted on the frame for forward and backward movement horizontally in line with the fixed shear blade, means for urging the abutment rearwardly, and a blank length control block carried with the ram and having a wedge face and a vertical face, said wedge face engaging the rear face of the abutment when the ram is elevated, whereby, the initial descent of the ram causes the wedge face to push the abutment forwardly a predetermined distance and continued descent of the ram causes the vertical face of the block to hold the abutment in set position with respect to the fixed and movable shear blades.

5. In a blank shearing machine for dividing bar or like stock into blank lengths, a frame, a fixed shear blade, a movable shear blade, a ram carrying said movable shear blade, and a blank length gauge assembly located in the line of stock feed to the rear of the blades, said assembly including, a pair of rods extending rearwardly from the frame, a blank gauging abutment slidably supported on the rods across the path of stock feed, springs associated with said rods and abutment for urging the abutment rearwardly, a bracket carried by the ram, and means carried by the bracket for actuating the spring urged abutment forwardly and rearwardly as the ram descends and ascends.

6. In a blank shearing machine for dividing bar or like stock into blank lengths, a frame, a fixed shear blade, a movable shear blade, a ram carrying said movable shear blade, a blank length gauge assembly located in the line of stock feed to the rear of the blades, said assembly including, a pair of rods extending rearwardly from the frame, a blank gauging abutment slidably supported on the rods across the path of stock feed, springs associated with said rods and abutment for urging the abutment rearwardly, a bracket carried by the ram, means carried by the bracket for actuating the spring urged abutment forwardly and rearwardly as the ram descends and ascends, said means comprising a blank length control block slidably supported on the bracket, and means connected to the bracket and said block for adjusting the same relative to said shear blades.

7. In a blank shearing machine for dividing bar or like stock into blank lengths, a frame, a fixed shear blade, a movable shear blade, a ram carrying said movable shear blade, a blank length gauge assembly located in the line of stock feed to the rear of the blades, said assembly including, a pair of rods extending rearwardly from the frame, a blank gauging abutment slidably supported on the rods across the path of stock feed, springs associated with said rods and abutment for urging the abutment rearwardly, a bracket carried by the ram, a blank length control block carried by the bracket and having a vertical face and a wedge face for engaging and moving the blank gauging abutment as the ram descends and ascends against the tension of said springs, and means for adjusting said block on the bracket so that when the wedge face thereof engages the control block, the stock engaging face of the latter is spaced a greater distance from the shear blades than the length of the blank to be cut from the stock and when the vertical face of the control block flushly engages the blank gauging abutment, the latter will be positioned with respect to the shear blades so that said blades will cut the blank from the stock in a length accurate with the distance between the cutting edges of the shear blade and the vertical face of the control block.

8. In a blank shearing machine for dividing bar or like stock into blank lengths, a frame, a fixed shear blade, a movable shear blade, a ram carrying said movable shear blade, a blank length gauge assembly located in the line of stock feed to the rear of the blades, said assembly including, a pair of rods extending rearwardly from the frame, a blank gauging abutment slidably supported on the rods across the path of stock feed, springs associated with said rods and abutment for urging the abutment rearwardly, a bracket carried by the ram, a blank length control block carried by the bracket and having a vertical face and a wedge face for engaging and moving the blank gauging abutment as the ram descends and ascends against the tension of said springs, and means for adjusting said block on the bracket, said means including a strap secured to the bracket, a plurality of adjusting screws threaded in the strap, said screws having their forward ends swivelled in the rear face of the control block and having their rear ends exposed for tool engagement at the rear face of the strap, and means for locking the screws in selected set position.

9. A blank length gauge for shearing machines having fixed and movable shear blades, comprising, a stock abutting blank gauge element slidably mounted for variable movement relative to said blades, and means connected to and synchronized with the movable shear blade automatically to set said blank gauge element a definite predetermined distance from the shear blades on the descent of the said movable shear blade.

10. A blank length gauge for shearing machines having fixed and movable shear blades, comprising, a blank length gauging assembly arranged at the rear of the machine and in the line of stock feed, said assembly including means synchronized with the movable shear blade for automatically shifting the stock from an overfed position backwardly to an accurate blank length position prior to the shear blades effecting cutting.

11. In a shearing machine having a fixed and a movable blade, a frame at the side of the machine opposite to that where the stock is fed in, a stock abutting blank gauge slidably and yieldably mounted on said frame, means adjustably connected to said movable blade and engaging said gauge to move the same toward said blades prior to cutting and holding said gauge during said cutting, and means connected to said movable blade for adjusting the position of said first named means.

12. In a blank shearing machine for dividing bar or like stock into blank lengths, a frame, a fixed shear blade, a movable shear blade, a ram carrying said movable shear blade, and a blank length gauge assembly located in the line of stock feed to the rear of the blades, said assembly including, a pair of rods extending rearwardly from the frame, a blank gauging abutment slidably supported on the rods across the path of stock feed, springs associated with said rods and abutment for urging the abutment rearwardly, and means controlled by the ram for actuating the spring urged abutment forwardly as the ram descends to define a predetermined stock length.

13. In a blank shearing machine for dividing bar or like stock into blank lengths, a frame, a fixed shear blade, a movable shear blade, a ram carrying said movable shear blade, and a blank length gauge assembly located in the line of stock feed to the rear of the blades, said assembly including, a support extending to the rear of the machine, a spring retracted blank gauging abutment slidably mounted on the support, and means controlled by the ram in its descent to move the abutment forwardly toward the blades to push the stock back to predetermined blank length prior to cutting.

14. In a shearing machine having a fixed blade and a ram carrying the movable blade, a frame at the side of the machine opposite to that where the stock is fed in, a stock abutting blank gauge slidably mounted on said frame for movement at right angles to the direction of movement of said ram and movable blade, resilient means for urging said gauge to a predetermined preliminary position away from the blades, and means controlled by the descent of the ram for applying a force to said gauge for moving the same to a final position toward said blades.

15. In a shearing machine having a fixed blade and a ram carrying a movable blade, a frame at the side of the machine opposite to that where the stock is fed and including guiding means extending at right angles to the direction of movement of said movable blade, a stock abutting blank gauge movably mounted on said guiding means, resilient means for urging said gauge to a predetermined preliminary position away from the blades, and means controlled by the ram during its descent for applying a force to said gauge to move it to a predetermined position toward said movable blade prior to the latter coming into cutting relation to the fixed blade.

16. In a shearing machine having a fixed blade and a ram carrying a movable blade, a frame at the side of the machine opposite to that where the stock is fed into cutting position between the blades and including guiding means extending at right angles to the direction of movement of said movable blade, a stock abutting blank gauge movably mounted on said guiding means, resilient means anchored to said guiding means for urging said gauge to a predetermined initial at rest position rearwardly from the blades, and means synchronized with said movable blade for applying a force to the said gauge to move it from a predetermined initial position to its final position relative to said movable blade.

PHILIP W. MOORE, Jr.

REFERENCES CITED

The following references are of record in the file of this patent:

UNITED STATES PATENTS

| Number | Name | Date |
|---|---|---|
| 395,031 | Boerner | Dec. 25, 1888 |